United States Patent
Iwami et al.

(10) Patent No.: US 7,477,990 B2
(45) Date of Patent: Jan. 13, 2009

(54) NAVIGATION APPARATUS

(75) Inventors: Ryotaro Iwami, Hyogo (JP); Nobuyuki Nakano, Osaka (JP); Tomohiro Terada, Osaka (JP); Takeshi Takahashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 10/568,679

(22) PCT Filed: Aug. 18, 2004

(86) PCT No.: PCT/JP2004/012154

§ 371 (c)(1),
(2), (4) Date: Feb. 17, 2006

(87) PCT Pub. No.: WO2005/017458

PCT Pub. Date: Feb. 24, 2005

(65) Prior Publication Data

US 2007/0021910 A1    Jan. 25, 2007

(30) Foreign Application Priority Data

Aug. 18, 2003   (JP)   ............................. 2003-294482

(51) Int. Cl.
    *G01C 21/00*    (2006.01)
(52) U.S. Cl. .................. 701/210; 340/995.13
(58) Field of Classification Search ............. 701/201, 701/209, 211; 340/995, 996, 995.13, 995.19, 340/995.24

See application file for complete search history.

(56) References Cited

U.S. PATENT DOCUMENTS

| | | | |
|---|---|---|---|
| 6,175,803 B1 * | 1/2001 | Chowanic et al. ........... 701/209 |
| 6,266,613 B1 * | 7/2001 | Nimura et al. ............... 701/210 |
| 6,622,089 B2 * | 9/2003 | Hasegawa et al. ........... 701/211 |
| 6,898,513 B2 * | 5/2005 | Blumbergs et al. .......... 701/200 |
| 7,133,771 B1 * | 11/2006 | Nesbitt ....................... 701/202 |

FOREIGN PATENT DOCUMENTS

| | | |
|---|---|---|
| JP | 9-297035 | 11/1997 |
| JP | 3274982 | 11/1998 |
| JP | 11-201767 | 7/1999 |
| JP | 2001-357499 | 12/2001 |

* cited by examiner

*Primary Examiner*—Dalena Tran
(74) *Attorney, Agent, or Firm*—Wenderoth, Lind & Ponack, L.L.P.

(57) ABSTRACT

A navigation apparatus for guiding a vehicle to a destination, a data storing section stores an information set including at least location information for identifying a location of a travel burden point on a road network, link information indicating a road linked to the travel burden point, and a reference hesitation value indicating a degree of a driver's hesitation to go through the travel burden point, and a characteristic value of the driver. A point guidance data generating section generates point guidance data representing guidance for the travel burden point based on a current location derived by a location deriving section, a path obtained by a path obtaining section, and the information set and the driver characteristic value stored in the data storing section.

10 Claims, 7 Drawing Sheets

F I G. 3
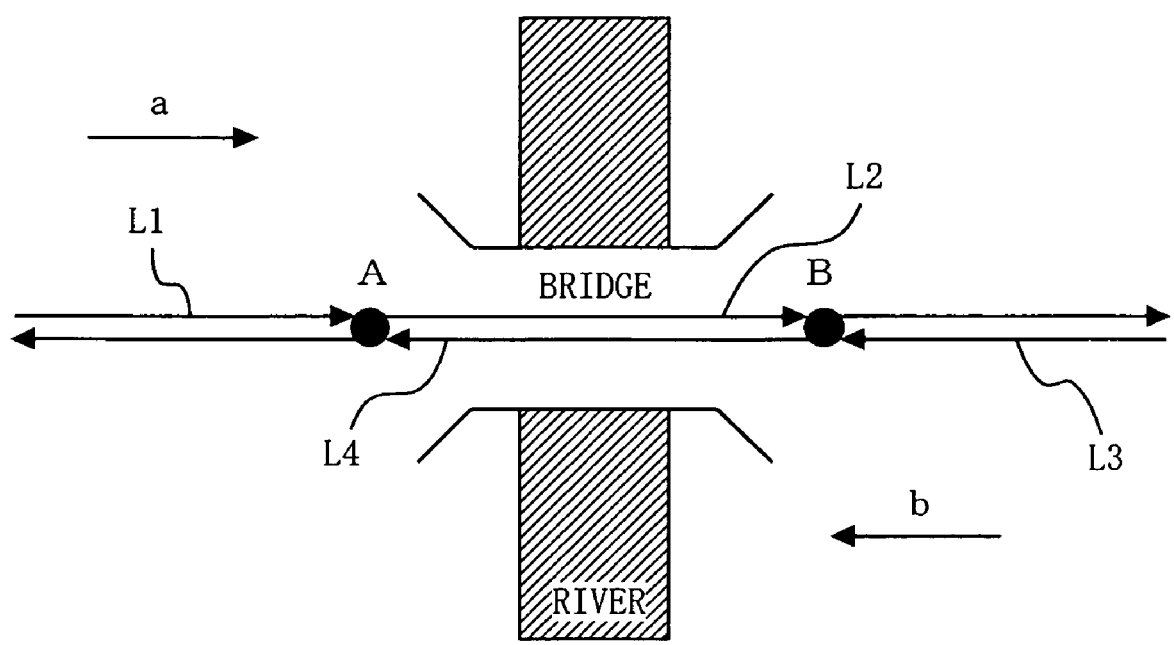

NAVIGATION APPARATUS

TECHNICAL FIELD

The present invention relates to a navigation apparatus, and more particularly, to a navigation apparatus which guides a vehicle to a destination.

BACKGROUND ART

Conventionally, in navigation apparatuses, a destination is set, a path from a current location to the destination is searched for, and a vehicle is guided along a found path to the destination. Specifically, in this case, the navigation apparatus indicates to which direction a vehicle should turn when the vehicle comes to a location close to each intersection on the path which the vehicle should turn. In contrast to this, the navigation apparatus indicates no guidance at an intersection at which the vehicle should go straight ahead or at a location at which the vehicle keeps going on the same road. Some other navigation apparatuses output guidance immediately before entering a bridge across which the vehicle should go, or traveling across a boundary between prefectures.

SUMMARY OF THE INVENTION

Even at a location where the vehicle only needs to travel on the same road or straight ahead, if the road width suddenly becomes narrower, the driver gets anxious, wondering if he or she should keeps going. The vehicle may have to go across a bridge until reaching a destination. It is often that once the vehicle starts crossing a bridge, the vehicle cannot readily go back to a location from which the vehicle entered the bridge. Therefore, if the driver does not have confidence to go across a bridge, the driver may hesitate to do so.

As described above, there are a number of locations on a path at which the driver gets anxious, wondering if the driver should keep going. As used herein, such a location is referred to as a "travel burden point". However, such anxiety varies among individuals. Therefore, one driver may get anxious about a location which another driver does not get anxious about.

However, conventional navigation apparatuses are designed to invariably output guidance at a location, such as a bridge or a boundary between prefectures, and therefore, cannot address the above-described difference among individuals.

Therefore, an object of the present invention is to provide a navigation apparatus in which it can be determined for each user whether or not guidance about a travel burden point is output.

To achieve the above-described object, an aspect of the present invention is directed to a navigation apparatus of guiding a vehicle to a destination. The navigation apparatus comprises a destination setting section of setting a destination in accordance with an input by a driver, a location deriving section of deriving a current location of the vehicle, a path obtaining section of obtaining a path from the current location derived by the location deriving section as a starting point to the destination set by the destination setting section, a data storing section of storing an information set including at least location information for identifying a location of a travel burden point on a road network, link information indicating a road linked to the travel burden point, and a reference hesitation value indicating a degree of a driver's hesitation to go through the travel burden point, and a characteristic value of the driver, a point guidance data generating section of gener-ating point guidance data representing guidance for the travel burden point based on the current location derived by the location deriving section, the path obtained by the path obtaining section, and the information set and the driver characteristic value stored in the data storing section, and an output section of outputting the guidance for the travel burden point in accordance with the point guidance data generated by the point guidance data generating. The point guidance data generating section compares a reference hesitation value contained in the information set stored in the data storing section with a driver characteristic value, and based on a result of the comparison, generates point guidance data.

Preferably, the navigation apparatus further comprises a travel burden point selecting section of selecting an information set of a travel burden point present within a predetermined range from the current location derived from the location deriving section, from the data storing section, based on the path obtained by the path obtaining section and the current location. The point guidance data generating section generates point guidance data based on the information set selected by the travel burden point selecting section.

The point guidance data generating section compares a reference hesitation value contained in the information set selected by the travel burden point selecting section with a driver characteristic value, and based on a result of the comparison, generates point guidance data.

As an illustrative example, the output section outputs a voice in accordance with the point guidance data generated by the point guidance data generating section.

As an illustrative example, the travel burden point is any of a bridge, an entrance of a tunnel, a grade crossing, an entrance point of an elevated road, a point where a road width suddenly becomes narrower, an entrance of a mountain road, an intersection where a road on which the vehicle is traveling intersects a road having a broader road width, an entrance of a shopping street, a point where a shrine gate is present, a point where a sign board or a road sign indicating that a destination is present in a direction different from a travel direction of a vehicle, and an entrance/exit of a parking lot.

A second aspect of the present invention is directed to a guidance method which is performed in a navigation apparatus and is for guiding a vehicle to a destination. The navigation apparatus comprises a data storing section of storing an information set including at least location information for identifying a location of a travel burden point on a road network, link information indicating a road linked to the travel burden point, and a reference hesitation value indicating a degree of a driver's hesitation to go through the travel burden point, and a characteristic value of the driver. The method comprises a destination setting step of setting a destination in accordance with an input by a driver, a location deriving step of deriving a current location of the vehicle, a path obtaining step of obtaining a path from the current location derived by the location deriving step as a starting point to the destination set by the destination setting step, a point guidance data generating step of generating point guidance data representing guidance for the travel burden point based on the current location derived by the location deriving step, the path obtained by the path obtaining step, and the information set and the driver characteristic value stored in the data storing section, and an output step of outputting the guidance for the travel burden point in accordance with the point guidance data generated by the point guidance data generating step. The point guidance data generating step compares a reference hesitation value contained in the information set stored in the data storing section with a driver characteristic value, and based on a result of the comparison, generates point guidance data.

A third aspect of the present invention is directed to a computer program which is performed in a navigation apparatus and is for guiding a vehicle to a destination. The navigation apparatus comprises a data storing section of storing an information set including at least location information for identifying a location of a travel burden point on a road network, link information indicating a road linked to the travel burden point, and a reference hesitation value indicating a degree of a driver's hesitation to go through the travel burden point, and a characteristic value of the driver.

The computer program comprises a destination setting step of setting a destination in accordance with an input by a driver, a location deriving step of deriving a current location of the vehicle, a path obtaining step of obtaining a path from the current location derived by the location deriving step as a starting point to the destination set by the destination setting step, a point guidance data generating step of generating point guidance data representing guidance for the travel burden point based on the current location derived by the location deriving step, the path obtained by the path obtaining step, and the information set and the driver characteristic value stored in the data storing section, and an output step of outputting the guidance for the travel burden point in accordance with the point guidance data generated by the point guidance data generating step. The point guidance data generating step compares a reference hesitation value contained in the information set stored in the data storing section with a driver characteristic value, and based on a result of the comparison, generates point guidance data.

As an illustrative example, the computer program is stored in a recording medium.

A fourth aspect of the present invention is directed to a navigation apparatus of guiding a vehicle to a destination. The navigation apparatus comprises a destination setting section of setting a destination in accordance with an input by a driver, a location deriving section of deriving a current location of the vehicle, a path obtaining section of obtaining a path from the current location derived by the location deriving section as a starting point to the destination set by the destination setting section, a calculation section of calculating a reference hesitation value indicating a degree of a driver's hesitation to go through a travel burden point on a road network after the path obtaining section obtains the path, a data storing section of storing an information set including at least the reference hesitation value calculated by the calculation section of the travel burden point, location information for identifying a location of the travel burden point, and link information indicating a road linked to the travel burden point, and a characteristic value of the driver, a point guidance data generating section of generating point guidance data representing guidance for the travel burden point based on the current location derived by the location deriving section, the path obtained by the path obtaining section, and the information set and the driver characteristic value stored in the data storing section, and an output section of outputting the guidance for the travel burden point in accordance with the point guidance data generated by the point guidance data generating section.

A fifth aspect of the present invention is directed to a guidance method which is performed in a navigation apparatus and is for guiding a vehicle to a destination. The navigation apparatus comprises a data storing section of storing at least location information for identifying a location of a travel burden point on a road network, link information indicating a road linked to the travel burden point, and a characteristic value of the driver. The method comprises a destination setting step of setting a destination in accordance with an input by a driver, a location deriving step of deriving a current location of the vehicle, a path obtaining step of obtaining a path from the current location derived by the location deriving step as a starting point to the destination set by the destination setting step, a calculation step of calculating a reference hesitation value indicating a degree of a driver's hesitation to go through a travel burden point on a road network after the path obtaining section obtains the path, a data storing step of storing at least the reference hesitation value of the travel burden point calculated by the calculation step, a point guidance data generating step of generating point guidance data representing guidance for the travel burden point based on the current location derived by the location deriving step, the path obtained by the path obtaining step, the reference hesitation value stored by the data storing step, and location information for identifying a location of a travel burden point on a road network, link information indicating a road linked to a travel burden point, and a characteristic value of a driver, which are stored in the data storing section, and an output step of outputting the guidance for the travel burden point in accordance with the point guidance data generated by the point guidance data generating step.

A sixth aspect of the present invention is directed to a computer program which is performed in a navigation apparatus and is for guiding a vehicle to a destination. The navigation apparatus comprises a data storing section of storing at least location information for identifying a location of a travel burden point on a road network, link information indicating a road linked to the travel burden point, and a characteristic value of the driver. The computer program comprises a destination setting step of setting a destination in accordance with an input by a driver, a location deriving step of deriving a current location of the vehicle, a path obtaining step of obtaining a path from the current location derived by the location deriving step as a starting point to the destination set by the destination setting step, a calculation step of calculating a reference hesitation value indicating a degree of a driver's hesitation to go through a travel burden point on a road network after the path obtaining section obtains the path, a data storing step of storing at least the reference hesitation value of the travel burden point calculated by the calculation step, a point guidance data generating step of generating point guidance data representing guidance for the travel burden point based on the current location derived by the location deriving step, the path obtained by the path obtaining step, the reference hesitation value stored by the data storing step, and location information for identifying a location of a travel burden point on a road network, link information indicating a road linked to a travel burden point, and a characteristic value of a driver, which are stored in the data storing section, and an output step of outputting the guidance for the travel burden point in accordance with the point guidance data generated by the point guidance data generating step.

The computer program is stored in a recording medium.

According the above-described aspects, guidance for a travel burden point is output based on a reference hesitation value and a driver characteristic value assigned thereto. Thereby, it is possible to provide a navigation apparatus capable of determining guidance for a travel burden point for each user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic diagram for explaining the contents of a travel burden point table Tp of FIG. 2.

DETAILED DESCRIPTION OF THE INVENTION

Figure 1:
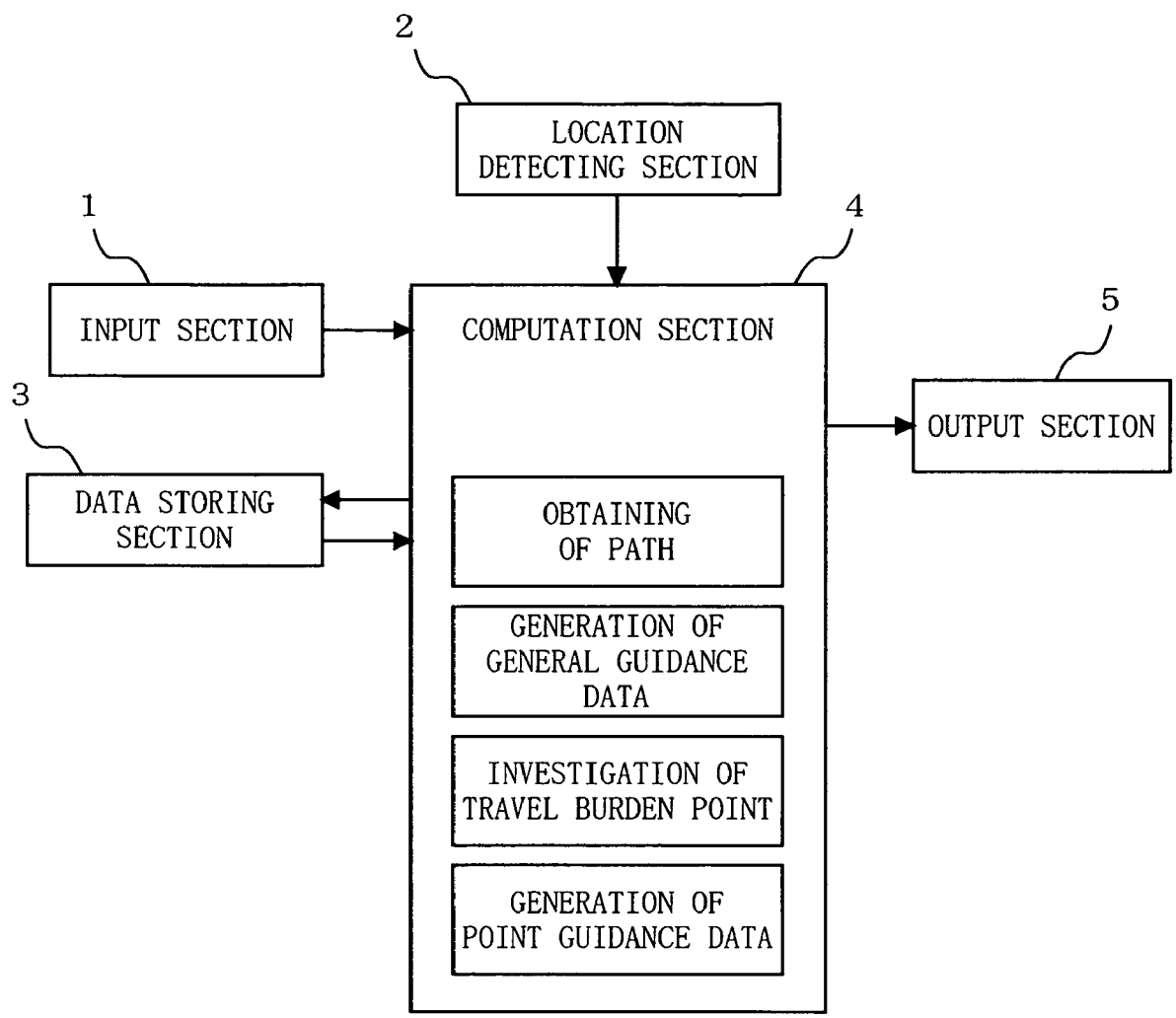
FIG. 1 is a block diagram illustrating a structure of a navigation apparatus according to an embodiment of the present invention.

FIG. 1 is a block diagram illustrating a structure of a navigation apparatus according to an embodiment of the present invention. In FIG. 1, the navigation apparatus is typically installed in a vehicle, and comprises an input section 1, a location detecting section 2, a data storing section 3, a computation section 4, and an output section 5.

As an illustrative example, the input section 1 is a remote controller specialized for the user to operate the navigation apparatus, a microphone for collecting the user's voice, or a mobile telephone or a Personal Digital Assistant (PDA) which has an IrDA (infrared communication) function. By operating the input section 1, the user inputs various information, such as, representatively, a setting for a destination, to the navigation apparatus. The input section 1 transmits predetermined information to the computation section 4 in response to the user's operation.

The location detecting section 2 typically includes a combination of a speed sensor and a gyrosensor, and a GPS receiver. The speed sensor detects a movement speed of a vehicle in which the navigation apparatus is installed, and the gyrosensor detects a travel direction of the vehicle. The GPS receiver detects an absolute location of the vehicle on the earth based on information transmitted from a Global Positioning System (GPS) satellite. Results of detection by these sensors and receiver are transferred to the computation section 4.

As an illustrative example, the data storing section 3 is composed of a CD-ROM, a DVD-ROM, a HDD (hard disk drive), or a memory. The data storing section 3 contains a map database (hereinafter referred to as "map DB") and user information.

Figure 2:
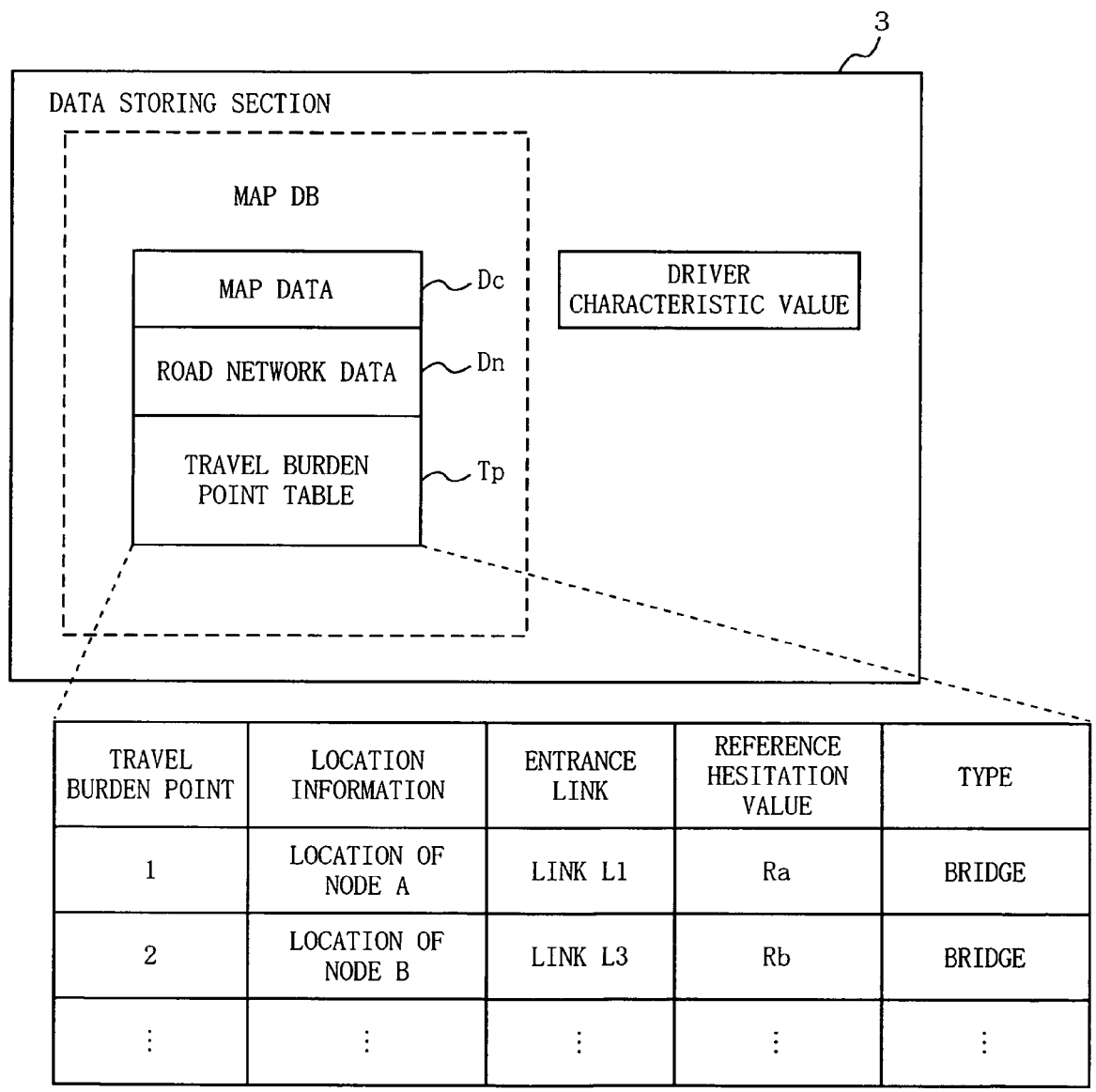
FIG. 2 is a schematic diagram illustrating a data structure of a map DB stored in a data storing section 3 of FIG. 1.

Here, FIG. 2 is a schematic diagram illustrating a data structure of the map DB stored in the data storing section 3 of FIG. 1. In FIG. 2, the map DB contains map data Dc indicating a map, road network data Dn indicating a road network using nodes and links, and a travel burden point table Tp.

The map data Dc and the road network data Dn may be those well known in the art, and will not be described in detail below.

The travel burden point table Tp contains location information, an entrance link, and a reference hesitation value for each travel burden point. The travel burden point refers to a location which the driver gets anxious about going through. Examples of such a travel burden point include an entrance to a bridge or a tunnel, a grade crossing, an entrance point to an elevated road, a point where a road width suddenly becomes narrower, and an entrance to a mountain road. Other examples thereof include an intersection at which a road on which a vehicle is traveling interests another road having a larger width, an entrance to a shopping street, and a point where a vehicle needs to go through a shrine gate or a gate. Still other examples thereof include a point where a sign board or a road sign indicating that a destination is located in a direction different from the traveling direction of a vehicle, and an entrance/exit of a parking lot.

The location information refers to information which indicates a location of a travel burden point of interest using, typically, a longitude coordinate and a latitude coordinate.

The entrance link refers to information which indicates a link representing a road which approaches a travel burden point of interest.

The reference hesitation value refers to an indicator which indicates how much the driver hesitates to go through a travel burden point of interest, and is previously written in the travel burden point table Tp.

For example, FIG. 3 illustrates a bridge which spans a river. For example, it is assumed that one end of the bridge is represented by a node A and the other end is represented by a node B in the road network data Dn. Also in the road network data Dn, a road section linked to the node A from the outside of the bridge is represented by a link L1, and a road section extending from the node A to the node B is represented by a link L2. Also in the road network data Dn, a road section linked to the node B from the outside of the bridge is represented by a link L3, and a road section extending from the node B to the node A is represented by a link L4.

Under the above-described assumptions, when a vehicle reaches the node A from the link L1 side, the node A is a travel burden point. When a vehicle reaches the node A from the link L4 side, the node A is not a travel burden point. When a vehicle reaches the node B from the link L3 side, the node B is a travel burden point. When a vehicle reaches the node B from the link L2 side, the node B is not a travel burden point.

From the above-described viewpoint, concerning a bridge as illustrated in FIG. 3, the travel burden point table Tp describes a combination of the location information of the node A, information indicating the link L1, and a reference hesitation value Ra. The travel burden point table Tp also describes a combination of the location information of the node B, information indicating the link L3, and a reference hesitation value Rb.

The reference hesitation value is determined, depending on an attribute of a travel burden point of interest. For example, concerning a bridge, a tunnel, or a grade crossing, it is assumed that, the larger the size thereof, the more it is difficult for a vehicle to return to an entrance point. Therefore, the reference hesitation value is set in proportion to the size.

As described above, a driver characteristic value is stored in the data storing section 3. The driver characteristic value refers to a value which indicates how much the user does not hesitate to go through a travel burden point. In this embodiment, it is assumed that, the higher the driver characteristic value, the lesser the user is anxious about a travel burden point, i.e., the lower the driver characteristic value, the more the user is anxious about a travel burden point. For example, such a driver characteristic value is input by the user operating the input section 1 when the navigation apparatus is started up.

The computation section 4 typically includes a ROM, a CPU, and a RAM. By the CPU being operated using the RAM as a working area in accordance with a computer program previously stored in the ROM, a path obtaining process, a general guidance data generating process, a travel burden point investigating process, and a point guidance data generating process are mainly performed.

When a destination is input from the input section 1, the path obtaining process is performed so as to obtain a path from the current location of a vehicle which is detected by the location detecting section 2, to the destination.

The general guidance data generating process is, as is well known, performed so as to generate data representing a voice for guiding a vehicle to a destination (hereinafter referred to as "general guidance data") in accordance a path obtained by the path obtaining process.

The travel burden point investigating process is performed so as to select a travel burden point present on a path represented by path data which is obtained by the path obtaining process from the travel burden point table Tp.

The point guidance data generating process is performed so as to generate data representing a guidance voice for a travel burden point (hereinafter referred to as "point guidance data") using a travel burden point selected by the travel burden point investigating process, the current location of a vehicle, and a driver characteristic value.

The output section 5 mainly includes a loudspeaker which outputs a voice. Note that, in this embodiment, an example in which the output section 5 does not include a display apparatus so as to prevent the driver from watching the display apparatus, will be described. However, the present invention is not limited to this. The output section 5 may include a display apparatus.

Hereinafter, a process of the navigation apparatus of FIG. 1 will be described with reference to a flowchart illustrated in FIG. 4.

Figure 4:
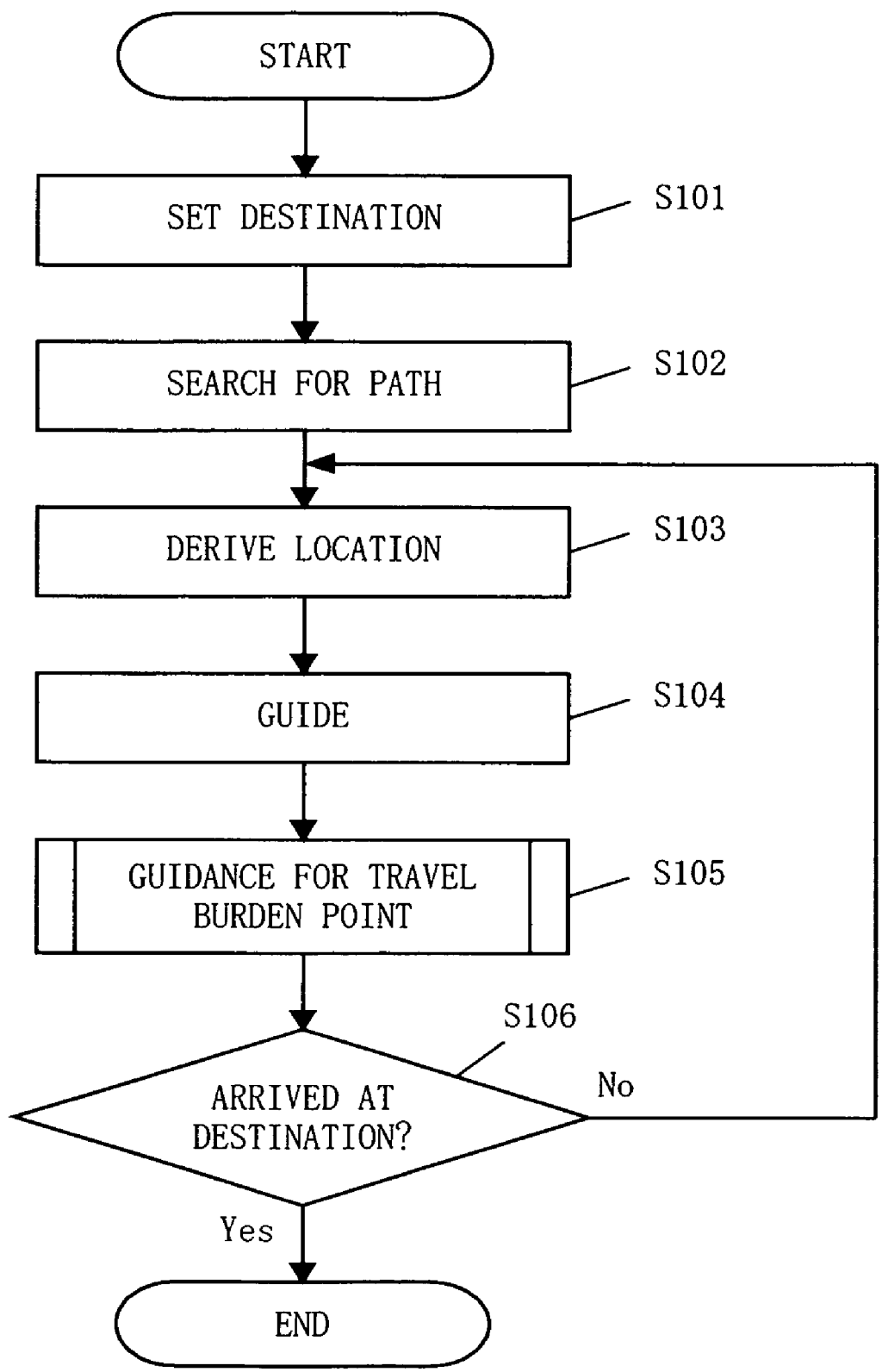
FIG. 4 is a flowchart illustrating a process of the navigation apparatus of FIG. 1.

In FIG. 4, the computation section 4 sets a destination for which the user is leaving (step S101). Here, a destination may be set using a well-known technique. For example, the user inputs an address and/or a zip code, or a telephone number by operating the input section 1, and the computation section 4 searches map data for a destination using the input information as a key, and sets the destination. Alternatively, when the output section 5 includes a display apparatus, the user initially operates the input section 1 to designate a destination directly on a map displayed on the display apparatus, and thereafter, the computation section 4 sets the designated place as a destination.

Next, the computation section 4 initially obtains an output value from the location detecting section 2, and subjects the output value thus obtained to the above-described map matching, thereby deriving the current location of the user. Thereafter, the computation section 4 obtains a path from the derived current location to a destination (step S102). Specifically, the computation section 4 typically uses a well-known algorithm, such as Dijkstra's method or A* method, to obtain a path. In the path search, a path may be searched for and recommended in accordance with a characteristic indicated by the user's designation, such as "ordinary road priority" or "highway priority", or a plurality of paths may be simultaneously obtained and one of them may be selected by the user. The computation section 4 may not execute the above-described program on its own so as to obtain a path. For example, a communications module, such as a mobile telephone, is used to access a remote server, so that derived current location and destination information are transferred to the server. The server searches for a path from the received current location to a destination, and returns the path to the navigation apparatus. In this manner, the computation section 4 may obtain a path.

Next, the computation section 4 derives the current location of the vehicle again (step S103).

Next, the computation section 4 performs a general guidance process (step S104). Specifically, the computation section 4 performs the general guidance data generating process to generate general guidance data for guiding the vehicle to the destination every time the vehicle approaches an intersection at which the vehicle should turn. The general guidance data is at least voice data for guiding in which direction the vehicle should turn using a voice. The output section 5 outputs a guidance voice in accordance with such general guidance data.

Next, the computation section 4 performs a travel burden point guiding process (step S105). The process of step S105 will be described in detail below with reference to FIG. 5.

Next, the computation section 4 determines whether or not the vehicle has reached the destination (step S106). When the result of the determination is Yes, the process of FIG. 4 is ended. When the result of the determination is No, the process of the computation section 4 returns to step S103.

Next, the process of step S105 will be described in detail with reference to a flowchart illustrated in FIG. 5.

Figure 5:
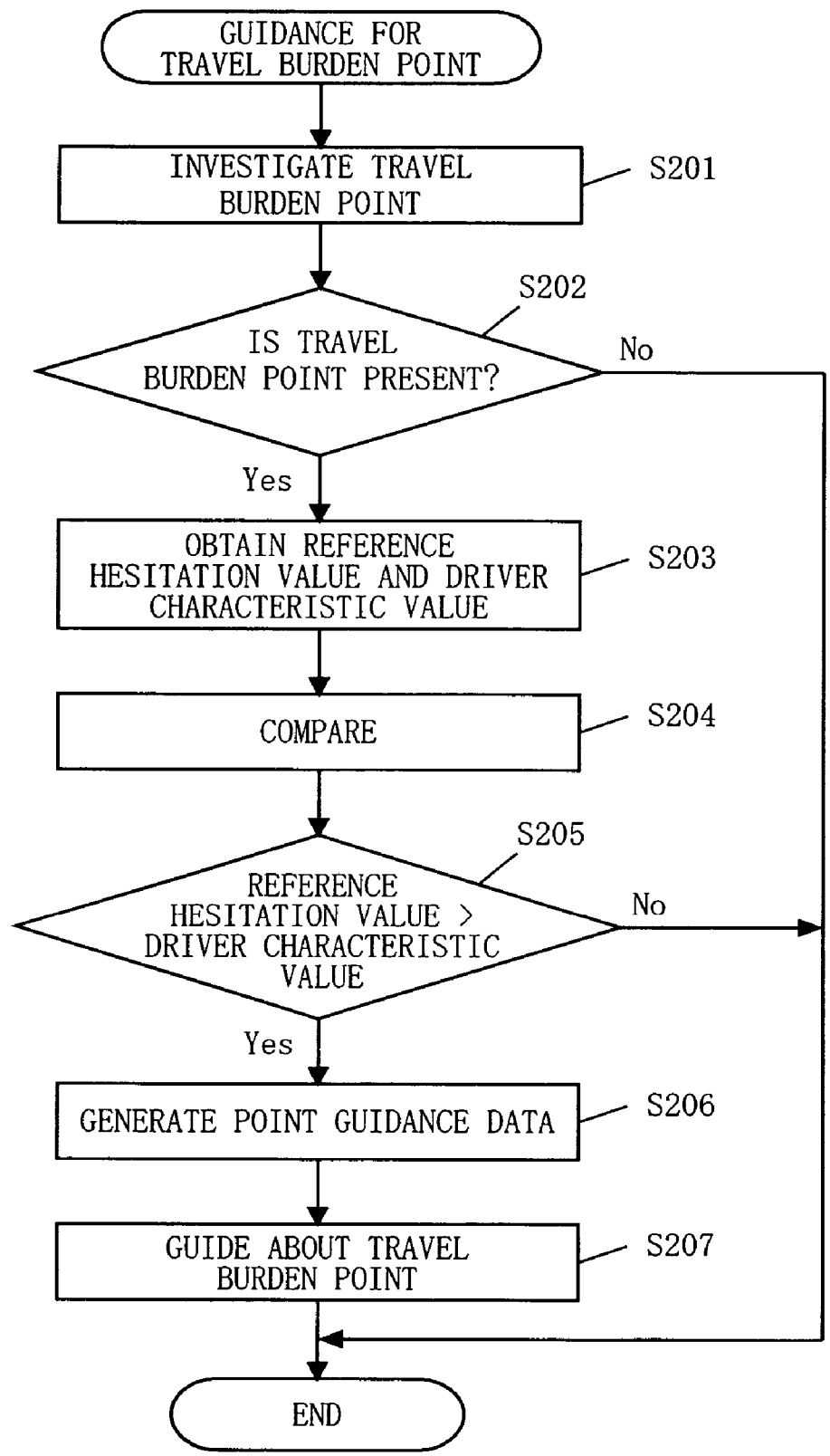
FIG. 5 is a flowchart illustrating a detailed process of step S105 of FIG. 4.

In FIG. 5, the computation section 4 investigates whether or not a travel burden point is present within a predetermined distance range from the current location so as to determine whether or not the vehicle will go through a travel burden point in a short time (step S201). Specifically, the computation section 4 uses the path data to track the path in the travel direction of the vehicle from the current location, and investigates whether or not each node located within the predetermined distance from the current location is a travel burden point, using the travel burden point table Tp.

As a result of the investigation, if no travel burden point is found (No in step S202), the computation section 4 ends the process of FIG. 5.

In contrast to this, if a travel burden point is found (Yes in step S202), the computation section 4 retrieves the reference hesitation value of the travel burden point of interest from the travel burden point table Tp, and the driver characteristic value thereof from the data storing section 3 (step S203).

Next, the computation section 4 compares the driver characteristic value thus retrieved with the reference hesitation value (step S204).

As a result of the comparison, if the reference hesitation value is smaller than or equal to the driver characteristic value (No in step S205), the computation section 4 ends the process of FIG. 5.

In contrast to this, if the reference hesitation value exceeds the driver characteristic value (Yes in step S205), point guidance data representing a voice indicating that matter is generated so as to cause the driver to go through the travel burden point, feeling safety (step S206). The output section 5 outputs a guidance voice in accordance with such point guidance data (step S207). Note that the computation section 4 preferably changes the timing and/or the contents of guidance for a travel burden point, depending on the type of the travel burden point. From such a viewpoint, the type of a travel burden point is recorded in the travel burden point table Tp of FIG. 2. In addition, the computation section 4 holds the timing of guidance and/or the contents of a voice, depending on the travel burden point type. The computation section 4 also generates point guidance data having timing and/or contents corresponding to the type currently obtained.

For example, if the type of a travel burden point relates to "bridge", point guidance data having contents that "we will go across a bridge ahead" is generated 300 m back from the travel burden point. In the case of a travel burden point having a "narrower road width", point guidance data having contents that "we will enter a narrow road soon. Please be careful" is first generated 500 m back from the travel burden point, and point guidance data having contents that "we will enter a narrow road ahead. Please slow down the speed" is further generated 100 m back from the travel burden point. Thus, preferably, in the case of some travel burden points, a plurality of types of point guidance data having different contents are generated, depending on the timing of guidance.

Here, when the point guidance data is composed of text and is output as a voice, guidance for a travel burden point may be output as a voice which is synthesized using a voice synthesizing engine. Alternatively, when human voice data is recorded in the data storing section 3, the computation section 4 may read voice data which constructs guidance, for a travel burden point, from the data storing section 3, and output a voice through a loudspeaker.

As the contents of guidance for a travel burden point, those which cause the driver to have confidence in keeping going are output at a location close to the travel burden point so as to remove anxiety and/or hesitation concerning that the vehicle travels straight or on the same road. For example, the navigation apparatus provides guidance that "please travel on an elevated road ahead" 100 m back from an entrance point of an elevated road, or guidance that "we will go through a shrine gate ahead" 100 m back from a point where the shrine gate is present.

As described above, the navigation apparatus of the present invention provides guidance for a travel burden point to the driver if the travel burden point is found during leading and guiding the driver. Here, it is determined based on the characteristic value of the driver whether or not the guidance for the travel burden point is output. Therefore, it is possible to provide a navigation apparatus which addresses differences in anxiety to a travel burden point among individuals.

Note that, in step S201, in addition to a travel burden point present in the travel direction of a vehicle, the computation section 4 may investigate a travel burden point present in other directions than the travel direction of the vehicle, taking into consideration a sudden direction change and/or guidance for a travel burden point which is not present on a path. Further, the computation section 4 may investigate a travel burden point present on each road branching off from the next intersection which a vehicle encounters, taking a sudden direction change into consideration.

Although it has been described in the embodiments above that a travel burden point is previously recorded in the data storing section 3, the navigation apparatus can register a travel burden point into the data storing section 3.

As described above, the travel burden point is a point where a psychological burden is applied on a driver while driving a vehicle on a path. To derive such a travel burden point, the navigation apparatus obtains a reference hesitation value for each point on a map. It is assumed that, the higher the reference hesitation value, the larger the anxiety and/or hesitation which the driver feels when going through a point of interest.

Figure 6A:
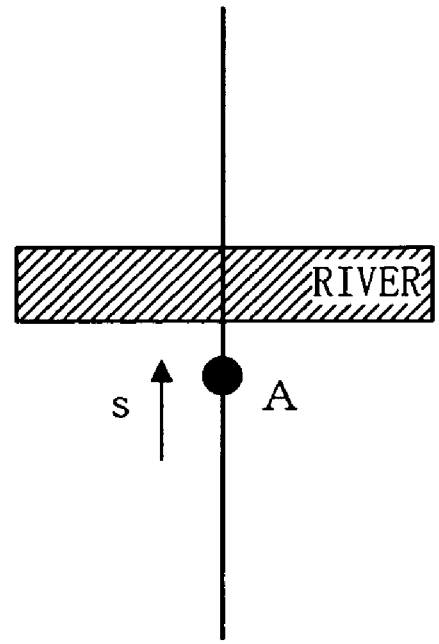
FIGS. 6A and 6B are schematic diagram illustrating an example of calculation of a reference hesitation value.
Figure 6B:
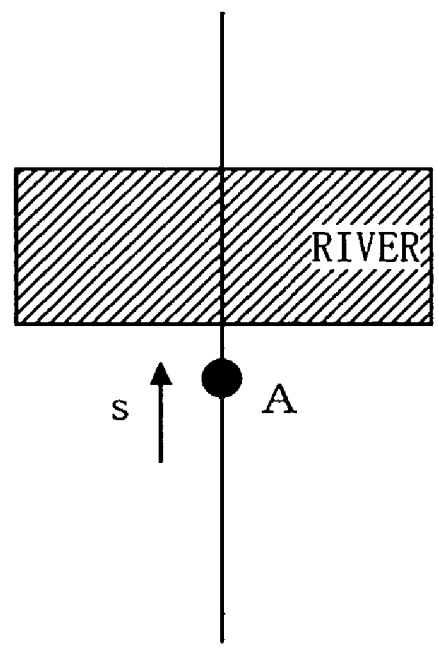

For example, when a vehicle goes across a road bridge, a reference hesitation value which is increased, depending on a width of a river, is obtained. As illustrated in FIG. 6A, when a vehicle travels from a point A in a direction indicated with arrow s to go across a road bridge which spans a river having a narrow width, a relatively small value (e.g., 10) is obtained as a reference hesitation value. In contrast to this, as illustrated in FIG. 6B, when a vehicle goes across a road bridge which spans a river having a broad width, a relatively large value (e.g., 20) is obtained as a reference hesitation value. In the case of road bridges, a reference hesitation value may be preferably calculated, taking into consideration other things concerning the road bridge, such as, for example, a length, a height, and/or the number of lanes, and/or the type of a river which the road bridge spans (e.g., a class-I river, a class-II river, . . . ).

Figure 7A:
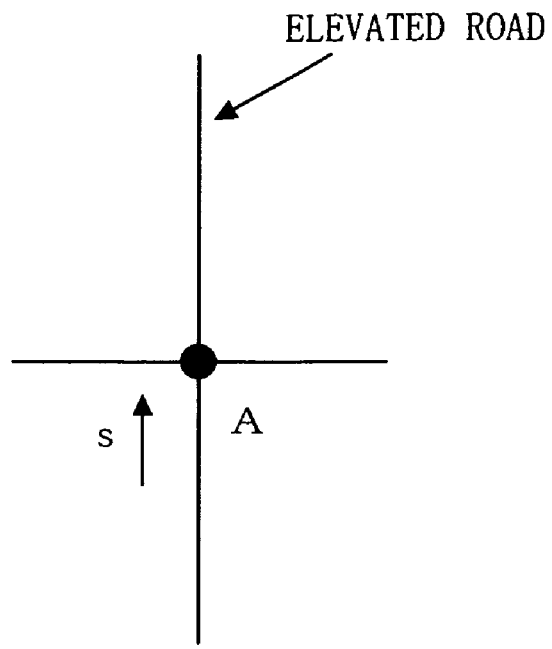
FIGS. 7A and 7B are schematic diagrams illustrating another example of calculation of a reference hesitation value.
Figure 7B:
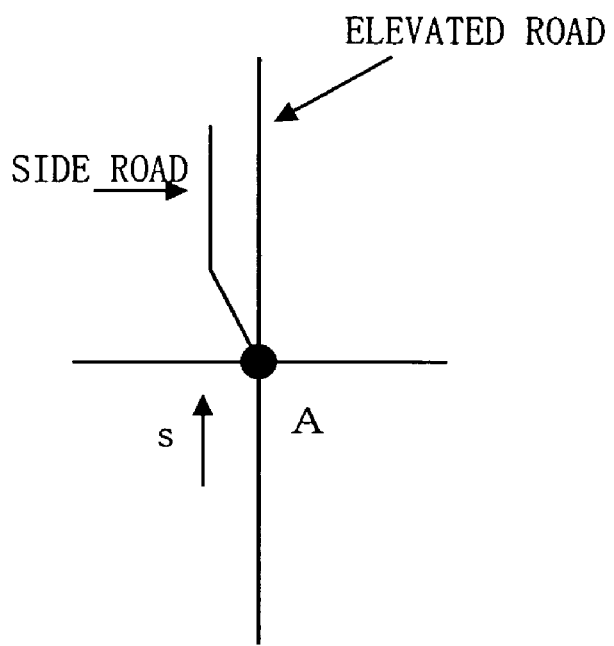

For example, when a vehicle goes through an elevated road, a reference hesitation value is obtained, taking into consideration a road structure at an entrance point of the elevated road. For example, as illustrated in FIG. 7A, since a point A is a general crossroads, a relatively small value (e.g., 7) is calculated as a reference hesitation value when a vehicle travels from the point A in a direction indicated with arrows. Conversely, as illustrated in FIG. 7B, when a road is bifurcated into an elevated road and a side road, the number of roads which a vehicle can travel is increased, possibly leading to confusion, and therefore, a relatively large value (e.g., 15) is calculated as a reference hesitation value. In the case of elevated road entrance points, a reference hesitation value may be preferably calculated, taking into consideration other things concerning the elevated road, such as, for example, an angle between a side road and the elevated road, and/or a lane width of each of the elevated road and/or the side road.

In addition, in the case of tunnel entrances, a reference hesitation value is calculated, taking into consideration, for example, the size of the tunnel entrance and/or the luminous intensity inside the tunnel. In the case of grade crossings, a reference hesitation value is calculated, taking into consideration, for example, a railroad width until a vehicle reaches an opposite end of the grade crossing, and/or the shape of a crossing gate.

Of the reference hesitation values thus calculated, the navigation apparatus records point(s) having values higher than or equal to a predetermined threshold, as travel burden points, in the data storing section 3.

On the other hand, even if a travel burden point is not previously recorded in the data storing section 3, the computation section 4 may calculate reference hesitation values, and determines a point whose reference hesitation value thus calculated is higher than or equal to the threshold, as a travel burden point in, for example, step S201 of FIG. 5. In this case, data indicating a condition under which reference hesitation values are calculated, needs to be previously recorded in the data storing section 3. For example, a parameter, such as "river: river width" or "elevated road: presence or absence of side road, angle of side road", is recorded. In addition, a method of calculating a reference hesitation value from a recorded river width before a vehicle goes across a road bridge, and/or a method of investigating the presence or absence of a side road before a vehicle enters an elevated road, and thereafter, when a side road is present, calculating a reference hesitation value from the angle of the side road, are recorded in the data storing section 3.

Although it has been described in the embodiments above that the reference hesitation value is a fixed value, the reference hesitation value may be multiplied by a coefficient which is based on road congestion information, time information, and/or weather information, and the product may be compared with a driver characteristic value.

Although it has been described in the embodiments above that the map DB contains the travel burden point table Tp, which is a dedicated table, the present invention is not limited to this. By assigning a flag indicating a travel burden point, and a reference hesitation value to each node contained in a node table which is held by a general navigation apparatus, a function similar to that of the travel burden point table Tp can be achieved.

Although it has been described in the embodiments above that the computer program is stored in a ROM, the present invention is not limited to this. The computer program may be distributed in a state of being stored a recording medium, such as, representatively, a CD-ROM, or alternatively, may be stored in a server on a network in a state of being able to be downloaded to a terminal apparatus.

While the invention has been described in detail, the foregoing description is in all aspects illustrative and not restrictive. It is understood that numerous other modifications and variations can be devised without departing from the scope of the invention.

The navigation apparatus of the present invention is useful as an in-vehicle apparatus or the like which can determine, for each user, whether or not guidance for a travel burden point is output.

The invention claimed is:

1. A navigation apparatus for guiding a vehicle to a destination, comprising:
   a destination setting section that sets a destination in accordance with an input by a driver;
   a location deriving section that derives a current location of the vehicle;
   a path obtaining section that obtains a path from the current location derived by said location deriving section as a starting point to the destination set by said destination setting section;
   a data storing section that stores an information set including at least location information for identifying a location of a travel burden point on a road network, link information indicating a road linked to the travel burden point, and a reference hesitation value indicating a degree of a driver's hesitation to go through the travel burden point, and a characteristic value of the driver;
   a point guidance data generating section that generates point guidance data representing guidance for the travel burden point based on the current location derived by said location deriving section, the path obtained by said path obtaining section, and the information set and the driver characteristic value stored in said data storing section; and
   an output section that outputs the guidance for the travel burden point in accordance with the point guidance data generated by said point guidance data generating section,
   wherein said point guidance data generating section compares a reference hesitation value contained in the information set stored in said data storing section with a driver characteristic value, and based on a result of the comparison, generates point guidance data.

2. The navigation apparatus according to claim 1, further comprising:
   a travel burden point selecting section that selects an information set of a travel burden point present within a predetermined range from the current location derived from said location deriving section, from said data storing section, based on the path obtained by said path obtaining section and the current location,
   wherein the point guidance data generating section generates point guidance data based on the information set selected by the travel burden point selecting section.

3. The navigation apparatus according to claim 2, wherein said point guidance data generating section compares a reference hesitation value contained in the information set selected by said travel burden point selecting section with a driver characteristic value, and based on a result or the comparison, generates point guidance data.

4. The navigation apparatus according to claim 1, wherein said output section outputs a voice in accordance with the point guidance data generated by said point guidance data generating section.

5. The navigation apparatus according to claim 1, wherein the travel burden point is represented by any one of a bridge, an entrance of a tunnel, a grade crossing, an entrance point of an elevated road, a point where a road width suddenly becomes narrower, an entrance of a mountain road, an intersection where a road on which the vehicle is traveling intersects a road having a broader road width, an entrance of a shopping street, a point where a shrine gate is present, a point where a sign board or a road sign indicating that a destination is present in a direction different from a travel direction of a vehicle, and an entrance/exit of a parking lot.

6. A guidance method for a navigation apparatus and for guiding a vehicle to a destination, wherein
   the navigation apparatus comprises a data storing section of storing an information set including at least location information for identifying a location of a travel burden point on a road network, link information indicating a road linked to the travel burden point, and a reference hesitation value indicating a degree of a driver's hesitation to go through the travel burden point and a characteristic value of the driver,
   the method comprising:
      setting a destination in accordance with an input by a driver;
      deriving a current location of the vehicle;
      obtaining a path from the current location derived as a starting point to the destination set;
      generating point guidance data representing guidance for the travel burden point based on the current location derived, the path obtained, and the information set and the driver characteristic value stored in the data storing section; and
      outputting the guidance for the travel burden point in accordance with the point guidance data generated,
   wherein the generation of the point guidance data includes comparing a reference hesitation value contained in the information set stored in the data storing section with a driver characteristic value, and based on a result of the comparison, generating point guidance data.

7. A computer program stored on a computer-readable medium which is executed in a navigation apparatus and is for guiding a vehicle to a destination, wherein
   the navigation apparatus comprises a data storing section of storing an information set including at least location information for identifying a location of a travel burden point on a road network, link information indicating a road linked to the travel burden point, and a reference hesitation value indicating a degree of a driver's hesitation to go through the travel burden point, and a characteristic value of the driver,
   the computer program comprising:
      a destination setting step of setting a destination in accordance with an input by a driver;
      a location deriving step of deriving a current location of the vehicle;
      a path obtaining step of obtaining a path from the current location derived by the location deriving step as a starting point to the destination set by the destination setting step;
      a point guidance data generating step of generating point guidance data representing guidance for the travel burden point based on the current location derived by the location deriving step, the path obtained by the path obtaining step, and the information set and the driver characteristic value stored in the data storing section; and an output step of outputting the guidance for the travel burden point in accordance with the point guidance data generated by the point guidance data generating step, wherein the point guidance data generating step compares a reference hesitation value contained in the information set stored in the data storing section with a driver characteristic value, and based on a result of the comparison, generates point guidance data.

8. A navigation apparatus for guiding a vehicle to a destination, comprising:

a destination setting section that sets a destination in accordance with an input by a driver;

a location deriving section that derives a current location of the vehicle;

a path obtaining section that obtains a path from the current location derived by said location deriving section as a starting point to the destination set by said destination setting section;

a calculation section that calculates a reference hesitation value indicating a degree of a driver's hesitation to go through a travel burden point on a mad network after said path obtaining section obtains the path;

a data storing section that stores an information set including at least the reference hesitation value calculated by said calculation section of the travel burden point, location information for identifying a location of the travel burden point, and link information indicating a road linked to the travel burden point, and a characteristic value of the driver;

a point guidance data generating section that generates point guidance data representing guidance for the travel burden point based on the current location derived by said location deriving section, the path obtained by said path obtaining section, and the information set and the driver characteristic value stored in said data storing section; and an output section that outputs the guidance for the travel burden point in accordance with the point guidance data generated by said point guidance data generating section.

9. A guidance method for a navigation apparatus and for guiding a vehicle to a destination, wherein the navigation apparatus comprises a data storing section of storing at least location information for identifying a location of a travel burden point on a road network, link information indicating a road linked to the travel burden point, and a characteristic value of the driver, the method comprising:

setting a destination in accordance with an input by a driver;

deriving a current location of the vehicle;

obtaining a path from the current location derived as a starting point to the destination set;

calculating a reference hesitation value indicating a degree of a driver's hesitation to go through a travel burden paint an a road network after the path obtaining section obtains the path;

storing at least the reference hesitation value of the travel burden point calculated;

generating point guidance data representing guidance for the travel burden paint based on the current location derived, the path obtained, the reference hesitation value stored, and location information for identifying a location of a travel burden point on a road network, link information indicating a road linked to a travel burden point, and a characteristic value of a driver, which are stored in the data storing section; and outputting the guidance for the travel burden point in accordance with the point guidance data generated.

10. A computer program stored on a computer-readable medium which is executed in a navigation apparatus and is for guiding a vehicle to a destination, wherein the navigation apparatus comprises a data storing section of storing at least location information for identifying a location of a travel burden point on a road network, link information indicating a road linked to the travel burden point, and a characteristic value of the driver, the computer program comprising:

a destination setting step of setting a destination in accordance with an input by a driver;

a location deriving step of deriving a current location of the vehicle;

a path obtaining step of obtaining a path from the current location derived by the location deriving step as a staffing point to the destination set by the destination setting step;

a calculation step of calculating a reference hesitation value indicating a degree of a driver's hesitation to go through a travel burden point on a road network after the path obtaining section obtains the path;

a data storing step of storing at least the reference hesitation value of the travel burden point calculated by the calculation step;

a point guidance data generating step of generating point guidance data representing guidance for the travel burden point based on the current location derived by the location deriving step, the path obtained by the path obtaining step, the reference hesitation value stored by the data storing step, and location information for identifying a location of a travel burden point on a road network, link information indicating a road linked to a travel burden point, and a characteristic value of a driver, which are stored in the data storing section; and an output step of outputting the guidance for the travel burden point in accordance with the point guidance data generated by the point guidance data generating step.

* * * * *